(12) United States Patent
Bazzo

(10) Patent No.: US 11,167,461 B2
(45) Date of Patent: Nov. 9, 2021

(54) METHOD FOR THE INJECTION MOULDING OF ARTICLES FORMED BY PLASTIC MATERIALS HAVING DIFFERENT CHARACTERISTICS

(71) Applicant: INGLASS S.p.A., San Polo di Piave (IT)

(72) Inventor: Maurizio Bazzo, San Polo di Piave (IT)

(73) Assignee: INGLASS S.p.A., San Polo di Piave (IT)

( * ) Notice: Subject to any disclaimer, the term of this patent is extended or adjusted under 35 U.S.C. 154(b) by 239 days.

(21) Appl. No.: 16/193,487

(22) Filed: Nov. 16, 2018

(65) Prior Publication Data

US 2019/0160718 A1    May 30, 2019

(30) Foreign Application Priority Data

Nov. 24, 2017    (IT) ........................ 102017000135341

(51) Int. Cl.
| | |
|---|---|
| *B29C 45/16* | (2006.01) |
| *B29C 45/00* | (2006.01) |
| *B29C 45/76* | (2006.01) |
| *B29C 45/22* | (2006.01) |

(Continued)

(52) U.S. Cl.
CPC ........ *B29C 45/164* (2013.01); *B29C 45/0025* (2013.01); *B29C 45/22* (2013.01); *B29C 45/76* (2013.01); *B29C 2045/0032* (2013.01); *B29C 2045/1651* (2013.01); *B29C 2045/1698* (2013.01); *B29C 2045/279* (2013.01); *B29C 2945/76056* (2013.01); *B29C 2945/76277* (2013.01); *B29C 2945/76381* (2013.01); *B29C 2945/76384* (2013.01); *B29C 2945/76568* (2013.01); *B29C 2945/76645* (2013.01);

(Continued)

(58) Field of Classification Search
None
See application file for complete search history.

(56) References Cited

U.S. PATENT DOCUMENTS

| | | | | |
|---|---|---|---|---|
| 4,699,581 A | * | 10/1987 | Nagasaka | ............... B29C 45/07 425/155 |
| 5,556,582 A | * | 9/1996 | Kazmer | ............. B29C 45/0025 264/40.1 |
| 6,120,714 A | | 9/2000 | Allan et al. | |

(Continued)

FOREIGN PATENT DOCUMENTS

| | | |
|---|---|---|
| CN | 1575953 A | 2/2005 |
| DE | 4107276 A1 | 9/1992 |

(Continued)

OTHER PUBLICATIONS

Priority Search Report dated Jun. 15, 2018 (7 pages).

(Continued)

*Primary Examiner* — Edmund H Lee
(74) *Attorney, Agent, or Firm* — RMCK Law Group, PLC

(57) ABSTRACT

The injection moulding of articles formed by plastic materials having different characteristics, for example of different colours, is carried out in a single injection cycle in which the first and the second plastic materials are injected into a first and into a second zone of a mould cavity by first and second injectors controlled according to specific modes so as to define a shape and/or a position of a weld line.

5 Claims, 3 Drawing Sheets

(51) Int. Cl.
    *B29L 31/30* (2006.01)
    *B29C 45/27* (2006.01)
(52) U.S. Cl.
    CPC ............... *B29C 2945/76765* (2013.01); *B29K 2995/0021* (2013.01); *B29L 2031/3044* (2013.01)

(56) References Cited

U.S. PATENT DOCUMENTS

| | | | | |
|---|---|---|---|---|
| 6,589,039 | B1* | 7/2003 | Doughty | B29C 45/27 264/328.8 |
| 8,246,334 | B2* | 8/2012 | Lee | B60R 13/0243 425/123 |
| 9,808,046 | B2* | 11/2017 | Baucom | A43B 17/14 |
| 2005/0012243 | A1 | 1/2005 | Saeki et al. | |
| 2006/0113693 | A1* | 6/2006 | McBain | B29C 45/1679 264/40.1 |
| 2010/0031531 | A1* | 2/2010 | Baucom | B29D 35/142 36/44 |
| 2011/0215495 | A1 | 9/2011 | Menke et al. | |
| 2014/0300019 | A1 | 10/2014 | Moss et al. | |
| 2015/0266216 | A1* | 9/2015 | Bazzo | B29C 45/0046 264/328.12 |

FOREIGN PATENT DOCUMENTS

| | | |
|---|---|---|
| DE | 4303497 A1 | 8/1994 |
| EP | 0205710 A2 | 12/1986 |
| FR | 2286702 A1 | 4/1976 |
| JP | 61104816 * | 5/1986 |
| JP | H06218766 A | 8/1994 |
| JP | H06270200 A | 9/1994 |
| JP | H10179258 A | 7/1998 |
| JP | 2009040028 A | 2/2009 |

OTHER PUBLICATIONS

1st Japanese Office Action dated Nov. 4, 2020 in connection with Japanese Application No. 2018-204580. 5 pages.
First Office Action (in Chinese and its English translation) and reference cited therein (CN1575953A and the corresponding U.S. application No. US2005/012243A1), dated Mar. 18, 2021 in connection with Chinese Application No. 201811406699.6. 39 pages.
German Office Action dated Apr. 29, 2021. 5 pages.

* cited by examiner

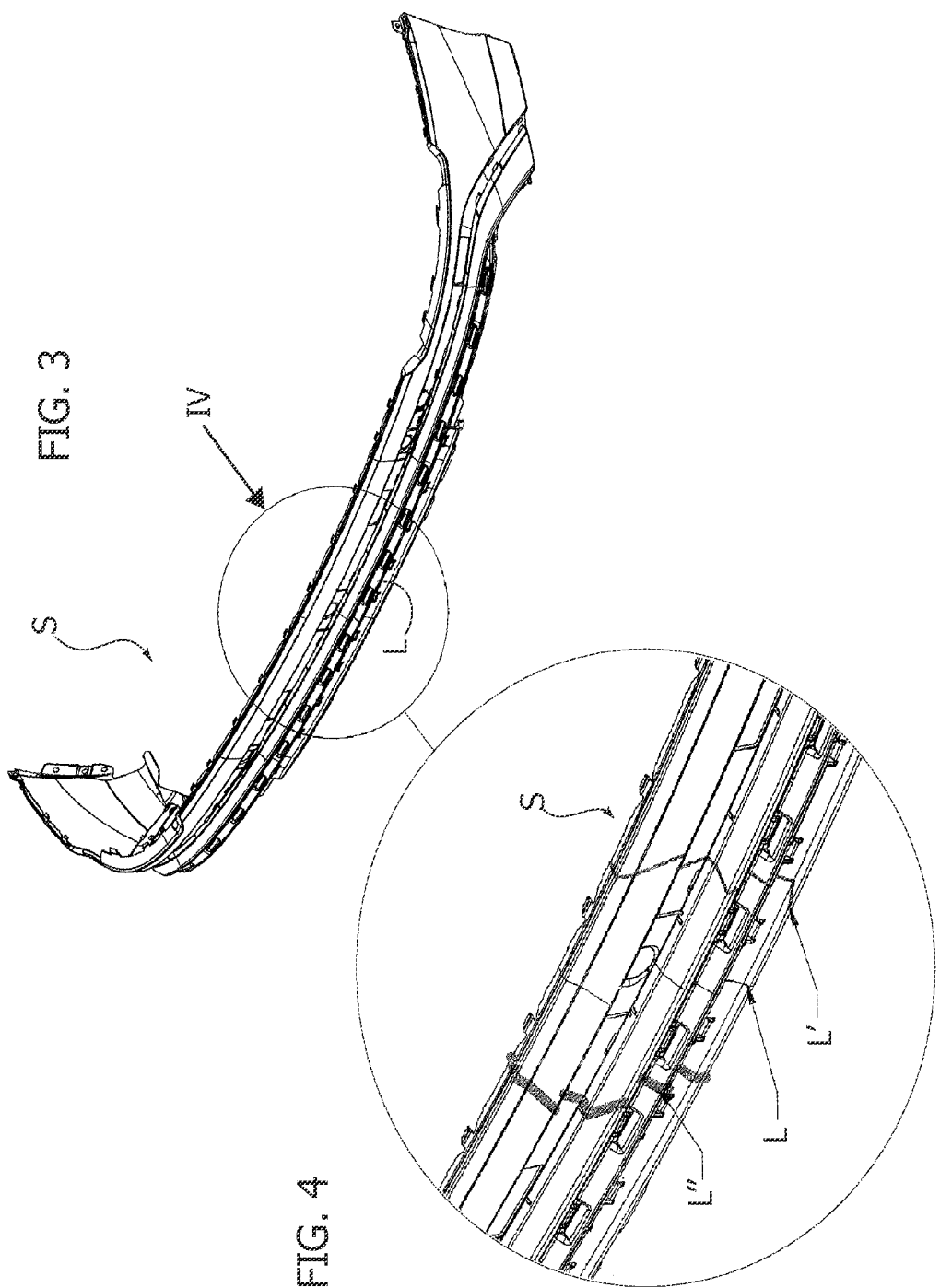

METHOD FOR THE INJECTION MOULDING OF ARTICLES FORMED BY PLASTIC MATERIALS HAVING DIFFERENT CHARACTERISTICS

CROSS-REFERENCE TO RELATED APPLICATION

This application claims priority to Italian Patent Application No. 102017000135341 filed Nov. 24, 2017. The disclosure of the above application is incorporated herein by reference in its entirety.

FIELD OF THE INVENTION

The present invention regards a method and an apparatus for the injection moulding of articles formed by plastic materials having different characteristics.

The expression "different characteristics" is used to indicate, in the description and in the claims that follow, plastic materials having the same composition but different colours to obtain articles of two or more different colours, or plastic materials having different compositions so as to obtain—in the same article—aesthetically or structurally different zones, for example having greater or lesser rigidity, or even both differences.

The invention particularly advantageously applies to the moulding of components of large dimensions for example in the automotive industry (bumpers, spoilers etc.) in which, for aesthetic and/or structural reasons, the aforementioned differentiations are required.

STATE OF THE PRIOR ART

As concerns the manufacturing of articles thus made, the conventional method typically provides for the use of rotary moulds between two (or more) stations for the injection of the two (or more) different materials.

For example, as concerns manufacturing a two-coloured article such as a lens of the rear light, the moulding phases initially provide for the injection of the material of a first colour into a first cavity to form the first part. The mould is then opened, rotated by 180° and closed again for the subsequent injection of the second material and the formation of the second part which is joined to the first part.

These moulds are very complex to manufacture and thus expensive, entail relatively long moulding times and require frequent maintenance operations. Furthermore, the weld line between the two (or more) parts of the moulded articles is uniquely and strictly determined and not susceptible, unless after modifying the mould, to variations that could possibly be suitable for improving the aesthetic result of the moulded articles.

Document U.S. Pat. No. 5,556,582 describes a system for controlling the injectors of an injection moulding apparatus in which each injector can be controlled individually to improve the quality of the moulded pieces using a single plastic material.

SUMMARY OF THE INVENTION

The object of the present invention is to overcome the aforementioned drawbacks and enable the injection moulding of articles formed by plastic materials having different characteristics, without having to use rotary moulds.

A further object of the invention is to be able to adjust the configuration, in terms of shape and position, of the weld line/s between the different materials.

According to the invention, this object is attained thanks to a method for the injection moulding of articles formed by plastic materials having different characteristics, characterised in that it is carried out in a single injection cycle consisting of:

providing a mould having at least one cavity in which there are identified at least one first and one second zone placed in communication with each other and to which there are associated respective first and second injectors with controlled opening and closing respectively supplied with at least one first plastic material and one second plastic material having said different characteristics, injecting the first and the second plastic material respectively into the first and into the second zone of the mould cavity by means of said first and second injectors so as to originate respective flow fronts whose collision generates at least one weld line, controlling said first and second injectors according to specific modes so as to define the shape and/or the position of said at least one weld line.

The following significant advantages are attained thanks to this solution idea:

Manufacturing simplification and small dimensions of the mould,
Lower mould designing/production costs,
Lower maintenance;
Higher productivity;
Flexibility of the shape and position of the weld line between the different injected materials.

As concerns the production of large articles, such as for example bumpers for motor vehicles, the injection is typically carried out using a plurality of injectors arranged along the cavity of the mould and controlled in a sequential or cascade manner. The moulding cycle provides for a filling phase in which the injectors are opened according to a preset sequence to progressively fill the mould cavity and a subsequent phase for packing the plastic material injected into the mould cavity.

The aforementioned said specific modes can be carried out in the filling phase and/or in the packing phase.

In particular in order to define the position of the weld line, the opening of the at least one injector can be anticipated or delayed with respect to the other injectors, and in order to define the shape of said weld line, at least one of the injectors can be opened gradually and only partially, and at least one of the injectors can be closed partially.

The invention also regards an apparatus for the injection moulding of articles formed by plastic materials having different characteristics, which is configured to carry out the aforementioned method.

BRIEF DESCRIPTION OF THE DRAWINGS

The invention will now be described in detail with reference to a non-limiting example illustrated in the attached drawings, wherein:

FIG. 3 shows in larger scale the bumper of FIG. 1, and FIG. 4 shows the enlargement indicated by the arrow IV of FIG. 3.

DETAILED DESCRIPTION OF THE INVENTION

The following description refers to a specific embodiment of the invention, in particular regarding the moulding of a bumper for motor vehicles, which shall however not be deemed limiting in any manner whatsoever. The invention also applies to the injection moulding of articles of any kind and type formed by two or more plastic materials having different characteristics in terms of aesthetic aspects, in particular colour and/or structural properties.

Figure 1:
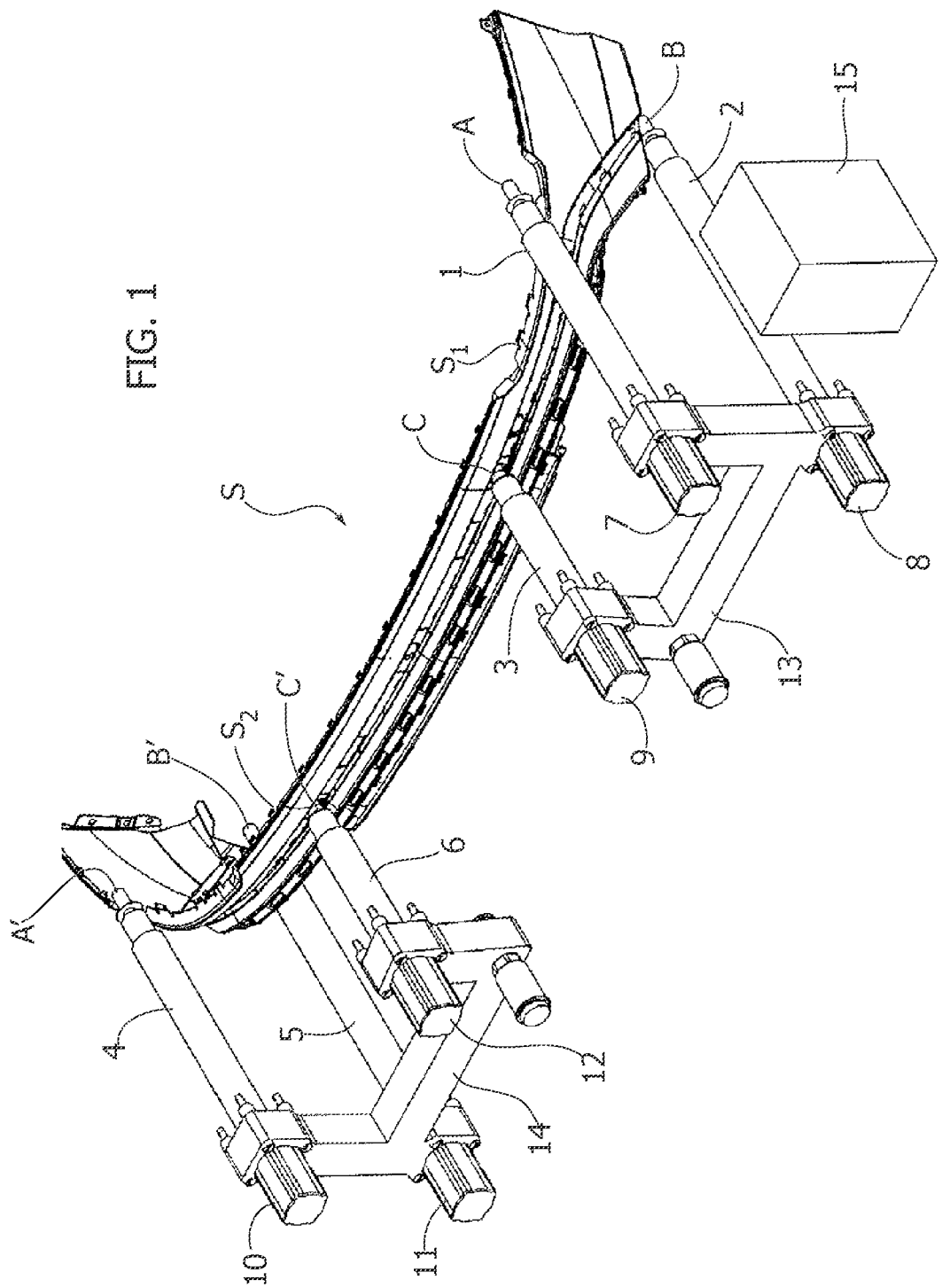
FIG. 1 is a partial and schematic perspective view which generally shows the essential components of an injection moulding apparatus according to the invention for obtaining a bumper for motor vehicles.
Figure 2:
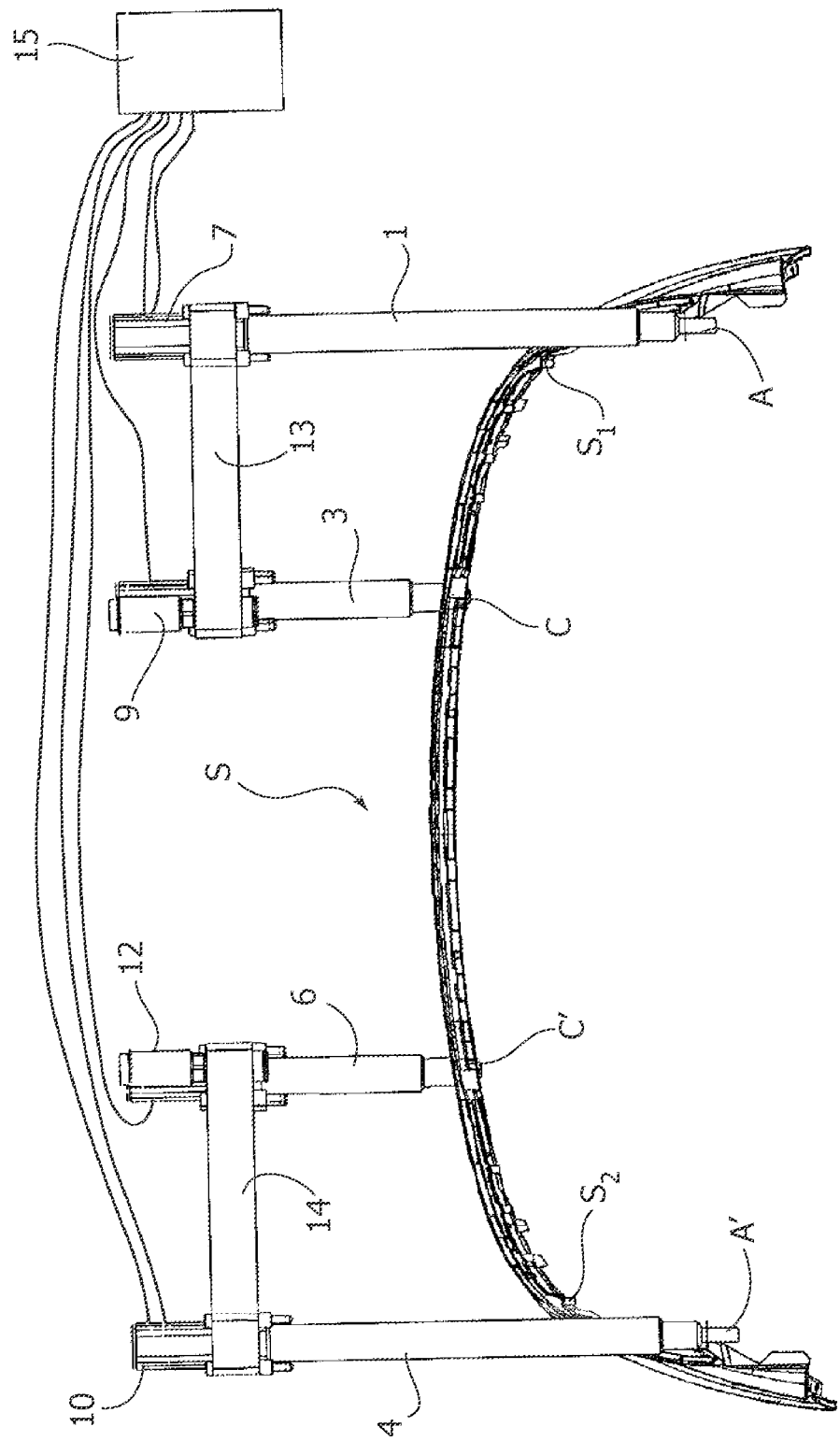
FIG. 2 is a plan view of FIG. 1.

FIG. 1 schematically shows the bumper S, i.e. the mould cavity for the forming thereof, and it entirely generally and essentially represents a sequential injection moulding apparatus for the forming thereof. In this schematisation, the equipment comprises six injection points provided in two groups of three A, B, C and A', B', C' arranged in proximity of the mutually communicating end zones S1, S2 of the mould cavity S.

The injection points A, B, C and A', B', C' consist, in an entirely conventional manner (for example as described and illustrated in US-2015/0266216 on behalf of the Applicant in question) in injectors 1, 2, 3 and 4, 5, 6 supplied by two distinct distributors 13, 14 of plastic material for example of two different colours. Each injector 1, 2, 3 and 4, 5, 6 comprises—in a conventional manner—a respective nozzle and a valve pin displaceable between a closing position and an opening position by means of a respective hydraulic, pneumatic or preferably electric actuator 7, 8, 9 and 10, 11, 12. The actuators 7-12 are controlled by an electronic unit 15, programmable for controlling the position and displacement speed of the valve pin of each injector 1, 2, 3 and 4, 5, 6, or groups of such injectors, between the opening and closing positions.

The moulding process can typically consist in a sequential injection which provides for a filling phase—simultaneous or at different times—of the zones S1, S2 of the mould cavity S, in which the injectors 1, 2, 3 and 4, 5, 6 are opened in pre-established sequences for progressively introducing the plastic material into such zones S1, S2, and a subsequent phase for packing the plastic materials thus injected.

During the filling phase, the plastic material of the first colour and that of the second colour introduced into the mould, originate two flow fronts that advance in opposite directions from the zones S1, S2 towards the central zone of the cavity S and whose collision generates the weld line schematised with L in FIGS. 3 and 4, which would be generally visible on the moulded piece.

According to the distinctive characteristic of the invention, the electronic unit 15 is configured for defining, by controlling the motors 7-12 and thus the injectors 1-6, the shape and/or the position of the weld line L.

For example, anticipating or delaying the opening of one or more of the injectors 1, 2, 3 or of the injectors 4, 5, 6 during the filling phase, the weld line L can be displaced on one side, as indicated with L' in FIG. 4, or on the opposite side in L". Basically, the weld line can thus translate parallel to itself for example up to being positioned in a non-aesthetic zone, such as for example a rib of the bumper S. In this case, the weld line will basically be invisible from the external.

The shape of the weld line L (or L' or L") can also be modified, so as to be curve-shaped instead of straight-shaped for example, if at least one of the injectors 1, 2, 3 or the injectors 4, 5, 6 is opened gradually and only partially, or if closed partially.

These are clearly only some of the possibilities of modifying the position and shape of the weld line L, which can be carried out with specific modes by the control unit 15 both in the filling phase and in the packing phase.

Obviously, pieces shaped differently from the bumper S may require a number, a positioning and specific injection modes different from those described in the example, but however managed for controlling and defining the shape and/or the position of the or of each weld line on the moulded piece. In all these cases, positioning and maintaining one or more injectors in partial opening/closing position will enable defining the shape of the weld line, and the opening anticipation/delay of one or more of the injectors will enable defining the positioning of the weld line.

What is claimed is:

1. A method for the injection moulding of articles formed by plastic materials having different characteristics, said method being carried out in a single injection cycle and comprising:
    providing a mould having at least one cavity having at least one first and one second zone placed in communication with each other and to which there are associated respective first and second injectors with controlled opening and closing, respectively supplied with at least one first plastic material and at least one second plastic material having said different characteristics,
    injecting the at least one first and the second plastic materials respectively into said first and into said second zone of the at least one mould cavity by said first and second injectors so as to originate respective flow fronts whose collision generates at least one weld line, and
    controlling said first and second injectors according to specific modes so as to define a shape and/or a position of said at least one weld line,
    wherein the opening of at least one injector of the first and second injectors is either anticipated or delayed with respect to the other injectors of the first and second injectors so as to define the position of said at least one weld line,
    wherein at least one of said first and second injectors is closed partially so as to define the shape of said at least one weld line, and
    wherein at least another one of said first and second injectors is opened gradually and only partially so as to define the shape of said at least one weld line.

2. The method according to claim 1, wherein for a filling phase in which said first and second injectors are opened according to pre-established sequences so as to progressively fill said first and second zones of the at least one mould cavity with said at least one first and second plastic materials, and a subsequent phase for packing such plastic materials injected into the at least one mould cavity.

3. The method according to claim 2, wherein at least one of said specific modes is carried out in the filling phase.

4. The method according to claim 2, wherein at least one of said specific modes is carried out in the packing phase.

5. A method for the injection moulding of articles formed by plastic materials having different characteristics, said method being carried out in a single injection cycle and comprising:
    providing a mould having at least one cavity having at least one first and one second zone placed in communication with each other and to which there are associated respective first and second injectors with controlled opening and closing, respectively supplied with at least one first plastic material and at least one second plastic material having said different characteristics, injecting the at least one first and the second plastic materials respectively into said first and into said second zones of the at least one mould cavity by said first and second injectors so as to originate respective flow fronts whose collision generates at least one weld line, controlling said first and second injectors according to specific modes so as to define a shape and/or a position of said at least one weld line, wherein opening of at least one injector of the first and second injectors is either anticipated or delayed with respect to the other injectors of the first and second injectors so as to define the position of said at least one weld line and wherein at least one of said first and second injectors is closed partially and at least another one of said first and second injectors is opened gradually and only partially so as to define the shape of said at least one weld line.

\* \* \* \* \*